Aug. 10, 1965

A. A. BRAMMERLO 3,200,317

STATOR WINDING ARRANGEMENT IN A SINGLE PHASE
INDUCTION TYPE MOTOR

Filed May 15, 1962

RUNNING WINDING

STARTING WINDING

Inventor:
Allen A. Brammerlo,
by John M. Stoudt
Attorney.

Inventor:
Allen A. Brammerlo,
by John M. Stoudt
Attorney.

Patented Aug. 10, 1965

3,200,317
STATOR WINDING ARRANGEMENT IN A SINGLE PHASE INDUCTION TYPE MOTOR
Allen A. Brammerlo, Sycamore, Ill., assignor to General Electric Company, a corporation of New York
Filed May 15, 1962, Ser. No. 196,846
9 Claims. (Cl. 318—220)

My invention relates in general to alternating current induction motors, and more particularly to an improved stator core assembly and winding arrangement for fractional and small horsepower motors. This application is a continuation-in-part of my co-pending application Serial No. 82,335, filed January 12, 1961.

For most appliance and other equipment application involving a high volume production of units, such as furnace fans, blowers for air conditioners, washing machines and the like where hundreds of thousands of electric motors are required per year, single phase induction motors of the resistance start split phase type have been conventionally used largely due to the economy inherent in their manufacture. These motors each include an auxiliary or starting winding wound to have a higher resistance than the main field winding, with the starting winding being physically displaced therefrom. In addition, a resistance is conventionally connected in series with the starting winding circuit. The difference in the resistance of the respective winding circuits causes an electrical displacement or phase angle difference between them, which provides a certain amount of starting torque to start the motor. There is also usually provided some device in series with the starting winding to open the starting winding circuit once the motor has attained a predetermined speed and the motor then operates with the main field winding alone being energized.

Although resistance start motors operate satisfactorily under running conditions, they have relatively poor starting characteristics and require a large power input (e.g., higher current) for a given amount of power or torque developed when compared with the more expensive single phase capacitor type split phase motors. In the past, the relatively low cost resistance start induction motor has been widely used in spite of this sacrifice in starting torque. However, recent developments in appliance and related fields require motors which have more starting torque than was generally available with use of the resistance type induction motor.

Accordingly, various schemes have been suggested for increasing the starting torque of the desirable resistance type induction motor, the schemes being successful to a limited extent. For example, one scheme included a higher resistance of the starting winding circuit (e.g., more turns of wire and/or a larger resistor placed in series with the starting winding) to increase the phase difference between the starting current and the main current which, when coupled with a higher current input, in turn, effected some improvement in starting performance. However, there are practical limitations in this approach. For instance, the Utilities and Underwriters Laboratories have strict regulations which limit the current which may be safely used and the resistance type induction motor is inherently a high current type of motor. Consequently, in view of the foregoing and especially in light of present day motor starting requirements, many manufacturers of appliances and other equipment have turned to the use of the higher priced capacitor type induction motor, even though this motor costs at least four dollars more per unit than a resistance type motor of the same over-all size.

It is therefore an object of this invention to provide improved starting performance of a split phase induction motor without adversely affecting the running performance or unnecessarily increasing the cost of the motor.

It is another object of the present invention to provide single phase resistance start split phase type induction motor with increased starting torque characteristics without an accompanying undesirable high starting current at a cost which is competitive even with conventional resistance start motors in general use today.

In carrying out the objects of this invention in one form thereof, I provide by way of exemplification an improved single phase resistance start split type induction motor in which a stator is provided with a main field winding forming a predetermined number of primary running poles and a starting winding forming a predetermined number of primary starting poles displaced in space from the running poles. Each of the poles comprises a plurality of concentrically arranged coils wound with a preselected number of turns of wires. In one embodiment, the number of turns of wire per running pole coil progressively increase from the innermost coil for each running pole and the number of turns of wire per starting pole coil progressively decrease from the innermost coil to the outermost coil for each starting pole. The precise number of turns in the individual coils of the respective poles for both windings are selected or chosen such that the lower order harmonics of the space mmf. produce flux harmonic components of the larger magnitudes, for instance the third, fifth and seventh harmonics, under each of the running poles are in additive relation with the corresponding harmonics of the space mmf. under each of the starting poles to produce an increase in torque for starting the motor without adversely affecting the running characteristics thereof.

The subject matter which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings.

Figure 1:
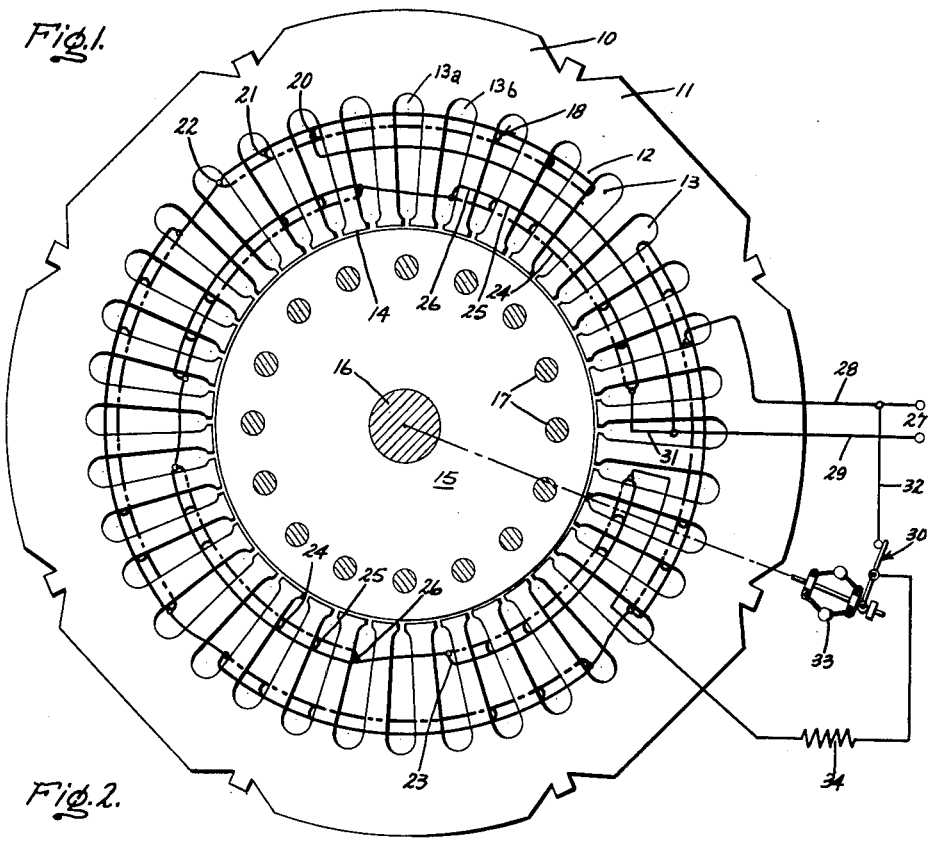
FIG. 1 is a schematic view of a single phase resistance split phase induction motor incorporating the preferred embodiment of the improved winding arrangement of the present invention, including the running and starting winding circuit.

Referring now to FIG. 1 of the drawings, the present invention is shown as applied to a four pole resistance split phase single phase induction motor having a stator core 10 conventionally formed of a stacked plurality of laminations punched from relatively thin magnetic material. Stator core 10 includes a yoke portion 11 and a plurality of uniformly spaced apart teeth 12 extending inwardly from yoke portion 11 to define a number of winding slots 13 therebetween and to provide a rotor receiving bore 14 in the usual way. The illustrated core is specifically constructed with thirty-six equally spaced apart winding slots. The structure for supporting stator core 10 has not been shown but it will be understood that the magnetic laminations may be suitably arranged and secured within a frame having end shields with bearings for rotatably carrying a rotor 15 within bore 14 secured to a shaft 16 in spaced relation to the stator core. As shown in FIG. 1, rotor 15 is of the squirrel-cage type and includes a standard squirrel-cage secondary winding formed of conductors 17 which are connected at each end of the rotor by short circuiting end rings (not shown).

A main field or running winding 18 is arranged in stator winding slots 13 to provide a plurality of main winding primary poles (four in number being illustrated), each pole being formed by three concentric coils, 20, 21, and 22 respectively, wound with a number of turns of wire, e.g., magnet wire. An auxiliary or starting winding 23 is accommodated in stator winding slots 13 and is displaced 90 electrical degrees from main winding 18 to provide a plurality of primary starting winding poles, equal in number to the main winding poles. Each of the illustrated starting winding poles is formed by three concentrically positioned coils, 24, 25, and 26 having a number of turns of suitable wire. The main winding 18 may be connected to a suitable single-phase source of supply 27 through conductors 28 and 29 and the starting winding 23 is connected in parallel with main winding 18 through a conventional switching arrangement, generally indicated by number 30, and conductors 31 and 32. An automatic device, responsive to the speed condition of the motor, such as centrifugal mechanism schematically shown at 33 may be employed to open the starting winding circuit as the motor comes up to speed. A phase modifying means in the starting winding circuit external to the motor such as resistor 34, may be used to obtain the desired phase difference in the currents of the main and starting windings 18 and 23 respectively.

By the present invention I relate the number of coils and wire turns for each pole of the primary main and starting windings so that the larger harmonic space flux components, for example, the third harmonic, of the respective windings have the same relationship to each other as that of the fundamental space flux components of the same windings under starting conditions. In addition, the resultant space flux produced by the main and starting windings will each attain a substantially sinusoidal space distribution. At speeds below synchronism for the respective individual harmonic fluxes, the harmonic fluxes in the one winding will augment the harmonic fluxes of the other winding to produce a resultant starting torque in the same direction of rotation as that of the fundamental torque. Accordingly, the torque producing forces are additive to provide a larger resultant starting force than has heretofore been attainable for motors of the same size which do not incorporate the present invention.

Figure 2:
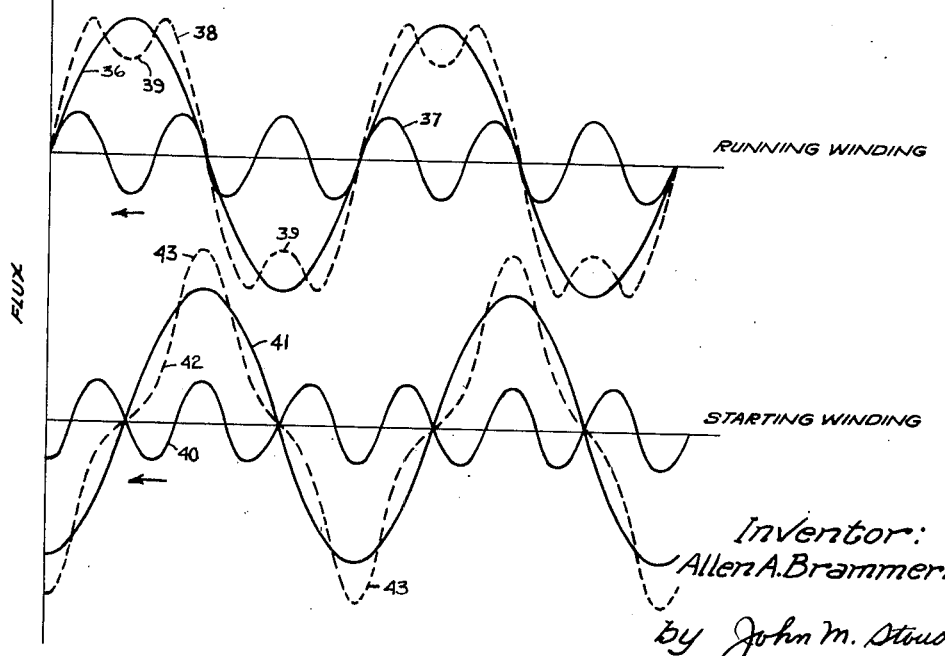
FIG. 2 is a graph illustrating the fundamental flux wave, certain space harmonic flux waves, and the resultant flux wave for the running and starting windings of the motor shown in FIG. 1 under starting conditions.

More specifically, in the preferred form, the main running winding 18 is wound such that innermost coil 20 of each primary main winding pole has less turns of magnet wire than the outermost coil 22 of the same pole, and preferably the turns of wire progressively increase in number from the innermost coil to the outermost coil. Each of the main running winding poles are identically wound. The resulting wave form for the running winding flux distribution is shown in FIG. 2. For convenience of illustration and discussion, only the third harmonic, fundamental, and total resultant main winding flux waves have been set out since the higher harmonic waves of flux do not appreciably affect the total resultant winding flux wave form. It will be seen that the fundamental and third harmonic flux waves, 36 and 37 respectively are sinusoidal in nature, and along with the higher order harmonic waves, produce resultant flux wave 38, which is substantially sinusoidal, having a slightly deformed or depressed wave peak 39.

With respect to the starting winding 23, each pole is preferably wound to provide the innermost coil 24 with a greater number of wire turns than the outermost coil 26, the number of turns gradually decreasing for each coil, from the innermost to the outermost coil. With this arrangement, as seen in FIG. 2, the starting winding will include sinusoidal harmonic waves of flux, only the third harmonic, denoted by numeral 40, being illustrated. The harmonic waves of flux, when taken together with the fundamental 41, produce a total resultant flux wave 42 (broken lines) which is substantially sinusoidal having an exaggerated peak 43.

Figure 3:
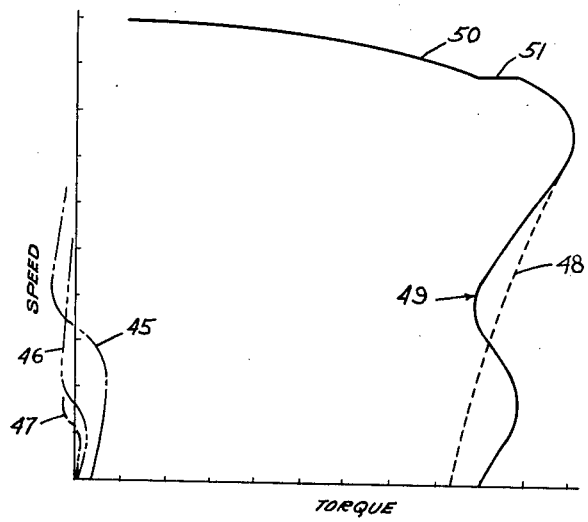
FIG. 3 is a graph setting forth the torque-speed performance of the motor of FIG. 1 employing the present invention.

Turning to FIG. 3, there is illustrated typical speed-torque curves developed by the fundamental and harmonic flux waves of the starting and main single phase windings discussed previously. Since the magnitude of the harmonic torque produced by the higher harmonic waves of flux; i.e., above the seventh harmonic, become decreasingly smaller in value and have a negligible total effect on the resultant torque of the motor, only the lower order harmonics (third, fifth, and seventh) need be considered. In the figure, broken lines 45, 46, and 47 represent the resultant third, fifth and seventh harmonic torques produced by the corresponding harmonic waves of flux of the combined main and starting windings when they are both energized during starting conditions. These torques vary between positive and negative values at different speeds, those portions shown to the right of the ordinant axis being positive. The combined fundamental torque of windings 18 and 23 is illustrated by the dotted line 48 which, when taken together with the resultant harmonic torques, results in a total resultant torque of the motor indicated by solid curve 49.

With both windings energized in the manner seen in FIG. 1 (centrifugal switch 30 being closed) and still referring to FIG. 3, from standstill to a speed somewhat below half speed of the motor, harmonic torques 45, 46, and 47 and fundamental torque 48 together effect a gain in the resulting starting torque. This gain is achieved at lower speeds where a large starting torque is required to overcome the inertia and starting friction of the load to be driven by the motor. Although at nearly half speed, the harmonics produce a dip in torque, the dip is not pronounced enough to provide a serious low torque point. At running speed, indicated on curve 49 by numeral 50, after the starting winding has been cut out (at 51) by the operation of switch 30 as the motor comes up to speed, the harmonic affect due to the running winding is not appreciable or detrimental to the over-all performance of the motor.

Thus, the resultant starting and accelerating torque, produced by the starting and running windings, 18 and 23, is improved by the employment of my invention in spite of the fact that a standard stator core structure with equally spaced winding slots has been used and that the total available coil receiving area of each slot has not been utilized to the fullest extent. Note, for instance in FIG. 1, that slot 13a, at the center of each main winding pole, carries no coils at all and that the slots 13b hold only the outermost coils 26 of the starting winding.

The following example is given in order to illustrate more clearly how the invention, as described above, has been carried forth in actual practive in a single phase resistance split phase type motor such as that shown in FIG. 1. A conventional stator core was used having thirty-six substantially identical equally spaced winding slots and having the following dimensions:

|  | Inches |
|---|---|
| Bore diameter | 3.481 |
| Outer peripheral diameter | 6.291 |
| Stack length | 1.20 |

The main winding coils for each running pole and the starting winding coils for each starting pole were wound in accordance with the winding distribution outlined above. More specifically, a standard size wire for fractional horsepower motors was used for each winding, 0.048 inch diameter enamel coated aluminum wire for the main winding and 0.0226 inch diameter enamel coated copper wire for the starting winding, with the following distribution:

| Main Winding | No. of Wire Turns | Starting Winding | No. of Wire Turns |
| --- | --- | --- | --- |
| Coil 20 (innermost) | 23 | Coil 24 (innermost) | 21 |
| Coil 21 | 31 | Coil 25 | 20 |
| Coil 22 (outermost) | 35 | Coil 26 (outermost) | 19 |

When tested, this motor produced a standstill torque of 39 oz. ft. with 45.6 amperes of current. This is especially significant since the main winding was wound with aluminum wire which has approximately sixty percent the conductivity of copper wire.

The starting characteristics of the tested motor embodying my invention may be better appreciated by a comparison of its performance with that of a conventionally wound four pole single-phase resistance start induction type motor using the same standard stator stack as described above for the example motor. The conventional motor included a main and starting winding of the same size wire set out for the example motor in which each of the running and starting poles were formed of concentric coils of wire, the coils progressively increasing in number of wire turns from the inside coil to the outside coil of each pole. This conventional motor carried more copper winding material in the stator slots than that of the example motor previously described. For instance, at least one of the starting winding poles contained four concentric coils having eleven, fourteen, nineteen, and twenty wire turns respectively from the innermost coil to the outermost coil. However, the motor was capable of producing only 34 oz. ft. of torque at standstill with a current of 46 amperes. Thus, for the same size frame, the conventional motor required more copper winding material and used more current to provide significantly less starting torque than a motor of corresponding size which employs my invention.

Thus, it will be appreciated that with the use of my invention, a motor such as the resistance split phase induction type may be provided with improved starting characteristics without requiring a re-design of presently available stator stacks, and the improvement is accomplished with an actual reduction in starting current, especially significant in inherently high current input types of motors. Further, lower cost material such as aluminum, may be used to provide the better starting performance and motors already in use may be conveniently rewound if desired in accordance with my improved arrangement to obtain the starting advantages of the invention.

Figure 4:
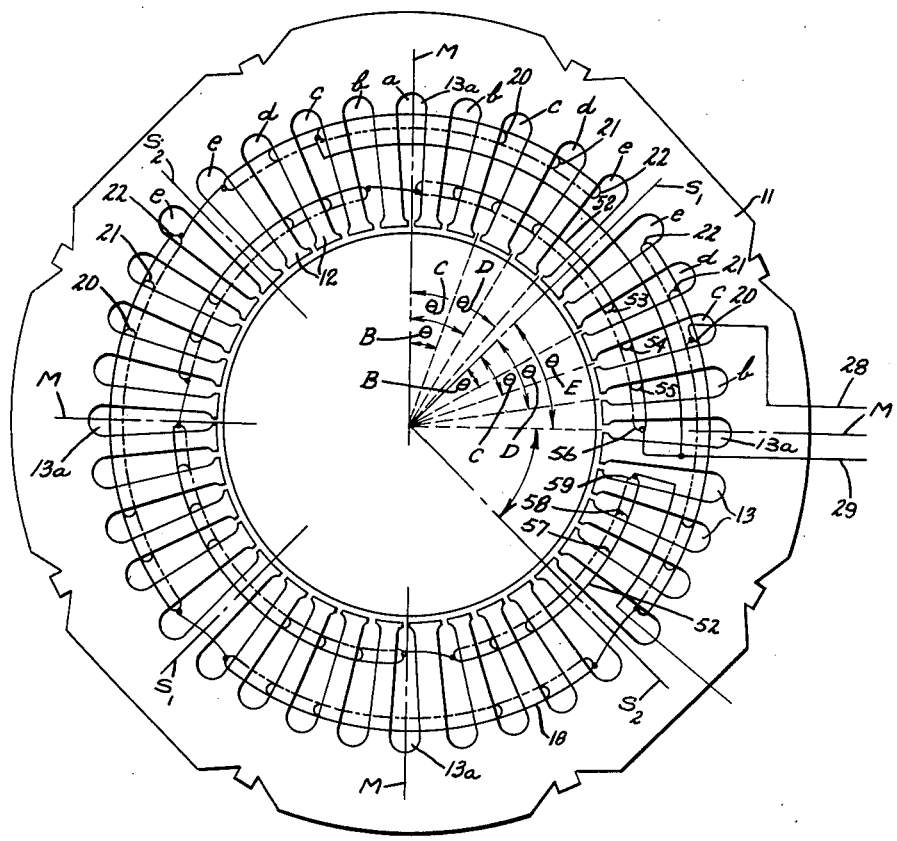
FIG. 4 is a schematic representation of the stator core shown in FIG. 1, incorporating another form of the present invention.
Figure 6:
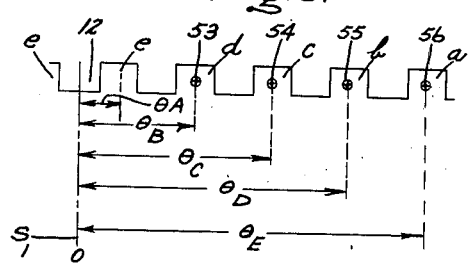
FIG. 6 is a similar illustration to that of FIG. 5 for the auxiliary winding of FIG. 4.
Figure 5:
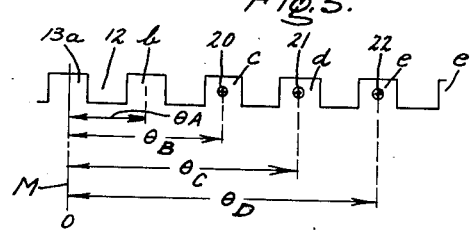
FIG. 5 is a diagrammatic illustration showing the electrical displacement of the individual coils in one primary pole of the main winding of FIG. 4 with respect to the center of the pole.

Referring now to FIGS. 4, 5, and 6 for purposes of explanation, another embodiment of the invention is disclosed in connection with the magnetic stator core 11 previously described for the embodiment of FIG. 1, and for convenience of identity, identical components are designated by like reference numerals. For instance, stator core 11 of the exemplification in FIG. 4 includes thirty-six equally spaced apart teeth 12 and winding slots 13, that is, the angular physical distance between adjacent teeth and slots is respectively 10°. As in the embodiment of FIG. 1, main winding 18 is carried in the slots to provide four main winding primary poles, 180 electrical degress apart, which are each formed by three concentric coils 20, 21 and 22 symmetrically arranged relative to slot 13a, the coils spanning a total of four, six and eight teeth respectively. In FIG. 4, only one of the main poles is referenced in detail, with the radial center of the pole being denoted by the letter M and the slots symmetrically provided around M identified by small letters $a$, $b$, $c$, $d$, and $e$. Preferably, the turns of wire progressively increase in number, inner coil 20 having the least number of turns and outer coil 22 including the greatest number. The resulting wave form for the running winding flux distribution is shown by FIG. 2, previously described with reference to the first embodiment.

Turning now to the auxiliary or start winding 52 illustrated in FIG. 4, the winding is displaced 90 electrical degrees from main winding 18 and includes four poles. Unlike winding 23 of FIG. 1, two of the diametrically opposed poles are defined by four concentric coils 53, 54, 55, and 56 (innermost to outermost), wound about radial pole center $S_1$, and correspondingly embrace three, five, seven and nine teeth. The other two poles each include three coils 57, 58, and 59 concentrically disposed around radial pole center $S_2$. It should be understood at this point that with the outermost coil 56 of the four coil start poles $S_1$ located in slot 13a, which is equidistant from adjacent start pole centers $S_1$, $S_2$ having different polarities, one half of the turns are effectively in each of the start poles around $S_1$ and $S_2$. Consequently, in effect, FIG. 4 illustrates a three and one-half concentric coil per start winding pole construction in which one half of the turns of coil 56 are considered to be in each of the start poles. This coil placement is preferable over the physical division of the number of turns in coil 56 between poles $S_1$, $S_2$, since it results in a very small outer coil for each pole effecting ease and simplicity in winding the arrangement of FIG. 4.

A noticeable improvement in starting performance was observed for the embodiment of FIG. 4 when an identical stator core 11 as that employed for the tested example motors previously outlined and wound with the same type and size wire, included the following winding distribution: main winding 18 had twenty-three, thirty-one, and thirty-five wire turns for concentric coils 20, 21 and 22, while start winding 52 comprised:

| Pole $S_1$ Coils | Actual wire turns, N | Pole $S_2$ Coils | Actual wire turns, N |
| --- | --- | --- | --- |
| 53 | 15 | 57 | 15 |
| 54 | 17 | 58 | 17 |
| 55 | 17 | 59 | 17 |
| 56 | 14 (7) | | -- (7) |

With this arrangement, there was produced a locked rotor torque of 37 oz. ft. at a little over 46 amperes.

In studying this result, I have found that with the foregoing distribution of turns for windings 18 and 52, the lower order harmonic space flux components (large in magnitude) of the one winding will have the proper phase relationship to the corresponding harmonic space flux components in the other winding so that they produce a torque in the same direction as the fundamental torque at speeds below the synchronous speeds of the individual harmonic torques. Accordingly, like the embodiment of FIG. 1, the torque producing forces are additive to provide a large resultant starting force.

With specific reference to the fundamental and harmonic flux waves and the magnitudes of the magnetomotive forces (mmf.) for the concentrically distributed windings of FIG. 4, the windings under consideration contain both half-wave and quarter-wave symmetry and only the odd harmonic exist. Consequently, the numerical value of the peak amplitude or magnitude for any given wave, taken at the radial center of a pole, may be expressed generally by the proposition:

$$P_n = \frac{4}{\pi}\left\{(N_A+N_B+ \ldots N_Z)\int_0^{\theta_A} \cos n\theta d\theta \right.$$
$$+ (N_B+N_C+ \ldots N_Z)\int_{\theta_A}^{\theta_B} \cos n\theta d\theta$$
$$\vdots$$
$$\left. + N_Z \int_{\theta_{Z-1}}^{\theta_Z} \cos n\theta d\theta \right\}$$

where P is the peak value for either the fundamental or odd harmonics; $n$ denotes the order of wave, fundamental ($n=1$) or harmonics ($n=3, 5$, etc.); $\theta$ generally describes electrical displacement for a given coil and $\theta$ with a capital letter subscript is the electrical angle of the given coil measured from the center of the pole, O, to the center of the slot which holds the coil; N with the capital letter subscript stands for the number of actual turns of wire in the given slot at electrical angle $\theta$, the capital letter Z denoting generally the outermost coil for the particular winding pole.

In the case of windings 18 and 52, and with reference to FIGS. 5 and 6, since no coils are included at the electrical angle $\theta_A$ (slot $b$ for winding 18 and slot $e$ for winding 52) the general proposition set out above, when intergrated, becomes the expression:

$$P_n = \frac{4}{n\pi}[(N_B+N_C+N_D+N_E)(\sin n\theta_B)$$
$$+ (N_C+N_D+N_E)(\sin n\theta_C - \sin n\theta_B) + (N_D$$
$$+N_E)(\sin n\theta_D - \sin n\theta_C) + N_E(\sin n\theta_E)]$$
$$= \frac{4}{\pi} T \text{(effective turns)}$$

Since the pole pitch for each of the winding poles is 180 electrical degrees, from FIGS. 4, 5, and 6, it will be seen that in the main winding, $\theta_B=40°$, $\theta_C=60°$, $\theta_D=80°$. By the same token, in the start winding, $\theta_B=30°$, $\theta_C=50°$, $\theta_D=70°$ and $\theta_E=90°$. By substituting in the above integrated expression these angles and the wire values N listed in the example given for FIG. 4, (using the number 7 for $N_E$ in the start winding), the fundamental and the lower order harmonics for the windings can be described as indicated in table set out below:

| $P_n$ | Main Winding 18 | Start Winding 52 |
|---|---|---|
| | $T_M$ | $T_S$ |
| $P_1$ (fundamental) | $+\frac{4}{\pi}$ (76.01) | $+\frac{4}{\pi}$ (43.49) |
| $P_3$ (3rd harmonic) | $-\frac{4}{3\pi}$ (10.38) | $+\frac{4}{3\pi}$ (8.00) |
| $P_5$ (5th harmonic) | $-\frac{4}{5\pi}$ (12.18) | $-\frac{4}{5\pi}$ (4.40) |

The sign in this table preceding the harmonics indicates its relationship to the fundamental and shows whether $P_n$ is positive or negative at the center of the pole.

In order for the windings to produce a large resultant force which improves starting performance, it is necessary for the torque produced by the harmonic fluxes to be in the same direction of rotation as that produced by the fundamental flux, the signs for the harmonics in the main and start windings must be opposite for the third harmonic and the same for the fifth harmonic. With this relationship the lower order harmonic space flux components (e.g. 3rd and 5th) of one winding will have the proper phase relationship to the other corresponding harmonic space flux components in the other winding; that is, the third and fifth harmonic components respectively of the running and starting winding flux have the same relationship to each other that the fundamental components of flux for the same windings have to each other. Therefore, the torque producing forces of the flux components are in the same direction and add to produce a larger resultant force.

This may be stated mathematically by the equation or expression $$G_n = \frac{T_S}{T_M} \sin (\phi_n)°$$

where the sign of $G_n$ for a given harmonic component of a given winding pole, if the same as that for the fundamental, gives an indication of a positive harmonic torque which will augment the fundamental. In the above equation, $\sin (\phi_n)°$ is the space displacement in electrical degrees between the center of adjacent start and main poles, for example, adjacent winding poles S and M in FIG. 4. For the fundamental listed in the above table, $G_1$ would be positive. With respect to the third harmonic, $$G_3 = \pm \frac{8.00}{10.38} \sin (90 \times 3)° = +K$$

This same analysis can be employed for the fifth harmonic of the winding arrangement of FIG. 4 which will also be in additive relation to the fundamental. Consequently, the third and fifth harmonic torques of the two windings will augment the fundamentals to provide a larger resultant force.

It will be appreciated from the foregoing that the concentric winding arrangement illustrated herein may be used in single phase motors other than a resistance split phase type and obtain the benefits of my invention. For example, the starting characteristics of split phase capacitor motors may be improved by incorporating the present invention in them.

It should be apparent to those skilled in the art, while I have shown and described what at present is considered to be the preferred embodiments of my invention in accordance with the Patent Statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. In an induction type motor, a magnetic stator core member having a plurality of slots, a main field winding arranged in said slots to form a predetermined number of primary running poles, a starting winding arranged in said slots to form a predetermined number of primary starting poles displaced in space from said primary running poles, each of said primary poles comprising a plurality of coils formed of preselected numbers of turns of wire, the number of turns of wire per primary pole coil progressively increasing from the innermost coil to the outermost coil for each pole of one of said windings, and the innermost coil of each of said primary poles of the other of said windings having at least as many turns of wire as the outermost coil thereof, the number of wire turns in the individual coils of the respective poles providing third and fifth harmonics of the space mmf. under each of the primary running poles in additive relation with the corresponding harmonics of the space mmf. under each of the primary starting poles to produce a high torque for starting the motor.

2. In a single phase induction type motor, a magnetic stator core member having a plurality of slots, a main field winding arranged in said slots to form a predetermined number of primary running poles, a starting winding arranged in said slots to form a predetermined number of primary starting poles displaced in space from said primary running poles, each of said primary poles comprising a plurality of concentrically disposed coils each formed of preselected numbers of turns of wire, means for de-energizing said starting winding after the motor reaches running conditions, the number of turns of wire per running pole coil progressively increasing from the innermost coil to the outermost coil for each pole, and the innermost coil of each of said primary starting poles having a greater number of turns of wire than the outermost coil of the same pole, the wire turns in the winding coils of the respective poles providing at least the third, fifth and seventh harmonics of the space mmf. under each of the primary running poles in additive relation with the corresponding harmonics of the space mmf. under each of the primary starting poles to produce a substantially high torque for starting the motor when both said main field and starting windings are energized.

3. In a resistance start split-phase induction electric motor, a magnetic stator core member having a plurality of slots, a main field winding arranged in said slots to form a predetermined number of running poles, a starting winding disposed in said slots to form a predetermined number of primary starting poles displaced in space from said primary running poles, a resistance connected in series with said starting winding, each of said primary poles comprising a plurality of coils formed of preselected numbers of turns of wire, the number of turns of wire per coil for each of said primary poles of one of said windings progressively increasing from the innermost coil to the outermost coil thereof, and the innermost coil of each of said primary poles of the other of said winding having at least as many turns of wire as the outermost coil thereof the wire turns in the individual coils of the respective poles providing at least the third and fifth harmonics of the space mmf. under each of the primary running poles in additive relation with the corresponding harmonics of the space mmf. under each of the primary starting poles to produce a relatively high torque for starting the motor.

4. A single phase resistance start split-phase induction electric motor including a magnetic stator core member having a plurality of slots, a main field winding arranged in said slots to form a predetermined number of running poles, a starting winding arranged in said slots to form a predetermined number of primary starting poles displaced in space from said primary running poles, a resistance connected in series with said starting winding, means for de-energizing said starting winding after the motor reaches running conditions, each of said primary poles comprising a plurality of concentrically disposed coils, each formed of preselected numbers of turns of wire, the number of wire turns per coil for each of said primary running poles progressively increasing from the innermost coil to the outermost coil thereof, and the number of wire turns per coil of each of said primary starting poles progressively decreasing from the innermost coil to the outermost coil thereof, each primary pole having the wire turns in the individual coils so distributed that at least the third, fifth and seventh harmonics of the space mmf. under each of the primary running poles are in additive relation with the corresponding harmonics of the space mmf. under each of the primary starting poles to produce a substantially high starting torque for the motor when both said main field and starting windings are energized under starting conditions.

5. In a single phase induction type motor, a magnetic stator core having a plurality of slots, a main field winding arranged in said slots to form a predetermined number of primary running poles, a starting winding arranged in said slots to form a predetermined number of primary starting poles having pole centers displaced a predetermined electrical angle from said primary running poles, said primary poles each comprising a plurality of concentric coils formed of a number of turns of wire, said running winding poles including at least three concentric coils and said start winding poles having at least three concentric coils, with the intermediate coils of each pole having more wireturns than either the inner or outermost coils thereof, the number of wire turns in coils of adjacent poles of same polarity producing third and fifth space harmonic components of the respective running and auxiliary winding fluxes in the same relation to each other that the fundamental flux components for the same winding poles have to each other.

6. In a single phase induction type motor, a stator core having a plurality of slots, a main field winding arranged in said slots to form a number of primary running poles, a starting winding disposed in said slots to form a number of primary starting poles having centers displaced approximately ninety electrical degrees from the adjacent centers of the primary running poles, said primary poles each capable of producing fundamental and odd order harmonic flux components and comprising at least three concentric coils having preselected numbers of wire turns, the inner coil of each starting pole having at least the same number of wire turns as that in the outer coil for the same pole and the intermediate coil having a different number of wire turns than either said inner or outer coils thereof, said numbers of wire turns of each running pole forming different effective turns $T_M$ for at least the fundamental, third harmonic and fifth harmonic flux components "$n$," said numbers of wire turns of each starting pole forming different effective turns $T_S$ for at least a given fundamental, third or fifth harmonic flux component "$n$," where for said poles the sign of the expression $$\frac{T_S}{T_M} \sin (90_n)°$$

for the fundamental is the same as that for the third and fifth harmonics with "$n$" being equal in said expression to 1, 3, and 5 respectively for the fundamental, third and fifth harmonics so that the torque producing forces of at least these flux components are in the same direction and in additive relation.

7. In a single phase induction type motor, a magnetic stator core having a number of slots; a main field winding arranged in said slots to form a number of primary main poles; an auxiliary winding disposed in said slots to form a number of primary auxiliary poles having centers displaced from the adjacent centers of the primary main poles; said primary poles each comprising a plurality of concentric coils having preselected numbers of wire turns; said running poles forming different effective turns for at least the fundamental, third harmonic, and fifth harmonic flux components; the auxiliary poles adjacent said running poles of the same polarity forming different effective turns for at least the fundamental, third harmonic, and fifth harmonic flux components; and the sign of the expression $$\frac{T_S}{T_M} \sin (\phi_n)°$$

being the same for at least the fundamental, the third harmonic, and fifth harmonic flux components in said adjacent poles, where in said expression $T_S$ is the effective turns of the given auxiliary pole for the fundamental, the third harmonic, or the fifth harmonic respectively, $T_M$ is the effective turns of the given main pole for the fundamental, the third harmonic, or the fifth harmonic respectively, $\phi$ is the number of electrical degrees between adjacent centers of said given main and auxiliary poles, and "$n$" respectively equals 1 for the fundamental, 3 for the third harmonic, and 5 for the fifth harmonic, the torque producing forces of the fundamental, third harmonic, and fifth harmonic flux components for said adjacent poles thereby being in the same direction and in additive relation.

8. In a single phase induction type motor, a magnetic stator core having a number of slots; a main field winding arranged in said slots to form a number of primary main poles; an auxiliary winding disposed in said slots to form a number of primary auxiliary poles having centers displaced from the adjacent centers of the primary main poles; said primary poles each comprising a plurality of distributed coils having preselected numbers of wire turns; a given running pole forming effective turns for each of at least the fundamental and third harmonic flux components; a given auxiliary pole adjacent said given running pole forming effective turns for at least the fundamental and third harmonic flux components; and the sign of the expression $$\frac{T_S}{T_M} \sin (\phi_n)°$$

being the same for at least the fundamental and the third harmonic flux components in said given poles, where in said expression $T_S$ is the effective turns of the given auxiliary pole for the fundamental or for the third harmonic respectively, $T_M$ is the effective turns of the given main pole for the fundamental or the third harmonic respectively, $\phi$ is the number of electrical degrees between adjacent centers of said given running and auxiliary poles, and "$n$" equals 1 for the fundamental and 3 for the third harmonic, the torque producing forces of the fundamental and third harmonic flux components for said given poles thereby being in the same direction and in additive relation.

9. A single phase induction type motor comprising a magnetic stator core having a number of slots; a distributed main field winding arranged in said slots to form a number of main poles; a distributed start winding disposed in said slots to form a number of auxiliary poles having centers displaced from the adjacent centers of the main poles; said main and auxiliary poles each comprising a plurality of concentric coils having preselected numbers of wire turns; a given main pole forming different effective turns for at least the fundamental and fifth harmonic flux components; a given auxiliary pole adjacent said given main pole forming different effective turns for at least the fundamental and fifth harmonic flux components; and the sign of the expression $$\frac{T_S}{T_M} \sin (\phi_n)°$$

being the same for at least the fundamental and the fifth harmonic flux components in said given poles, where in said expression $T_S$ is the effective turns of the given auxiliary pole for the fundamental or for the fifth harmonic respectively, $T_M$ is the effective turns of the given main pole for the fundamental or for the fifth harmonic respectively, $\phi$ is the number of electrical degrees between adjacent centers of said given running and auxiliary poles, and "$n$" equals 1 for the fundamental and 5 for the fifth harmonic, the torque producing forces of the fundamental and fifth harmonic flux components for said given poles thereby being in the same direction and in additive relation.

References Cited by the Examiner

UNITED STATES PATENTS 2,896,144  7/59  Mollenberg _____ 318—224.1

JOHN F. COUCH, *Primary Examiner.*

ORIS L. RADER, *Examiner.*